(12) United States Patent
Teulou

(10) Patent No.: US 8,162,257 B2
(45) Date of Patent: Apr. 24, 2012

(54) NACELLE FOR DOUBLE FLOW ENGINE

(75) Inventor: Olivier Teulou, Buzet sur Tarn (FR)

(73) Assignee: Airbus Operations SAS, Toulouse (FR)

( * ) Notice: Subject to any disclaimer, the term of this patent is extended or adjusted under 35 U.S.C. 154(b) by 318 days.

(21) Appl. No.: 12/551,648

(22) Filed: Sep. 1, 2009

(65) Prior Publication Data

US 2010/0072324 A1 Mar. 25, 2010

(30) Foreign Application Priority Data

Feb. 9, 2008 (FR) ...................... 08 55880

(51) Int. Cl.
*F02K 1/54* (2006.01)
(52) U.S. Cl. .................. 244/110 B; 60/226.2
(58) Field of Classification Search .............. 244/110 B; 60/226.2; 239/265.37
See application file for complete search history.

(56) References Cited

U.S. PATENT DOCUMENTS

| | | | |
|---|---|---|---|
| 3,829,020 A | 8/1974 | Stearns | |
| 5,987,880 A * | 11/1999 | Culbertson | ............ 60/204 |
| 6,438,942 B2 * | 8/2002 | Fournier et al. ............. | 60/226.2 |
| 6,895,742 B2 * | 5/2005 | Lair et al. .................... | 60/226.2 |
| 2007/0007388 A1 * | 1/2007 | Harrison et al. .......... | 244/110 B |

FOREIGN PATENT DOCUMENTS

| | | |
|---|---|---|
| FR | 2146109 A | 3/1973 |
| FR | 2618391 A1 * | 1/1989 |
| FR | 2887225 A1 | 12/2006 |
| WO | 2008/045070 A | 4/2008 |

OTHER PUBLICATIONS

French Search Report dated Apr. 29, 2009.

* cited by examiner

*Primary Examiner* — Christopher P Ellis
(74) *Attorney, Agent, or Firm* — Perman & Green, LLP

(57) ABSTRACT

A nacelle for double-flow engine with a cowling and at least one thrust reverser, the thrust reverser having an internal door and an external door arranged in the cowling, and means for simultaneously shifting these doors between a stable retracted position in which the doors are integrated in the cowling and a stable deployed position in which the internal and external doors are positioned at least partially inside and outside of the nacelle, respectively, to deflect the secondary flow and to generate a thrust reversal. The means for simultaneously shifting the doors comprise an actuator, one extremity of which is linked to one of the doors to shift this door between the extreme positions, and at least one linkage element linked to the doors to pivot by its extremities, so that the shifting of the door entails the shifting of the other door between these extreme positions.

8 Claims, 3 Drawing Sheets

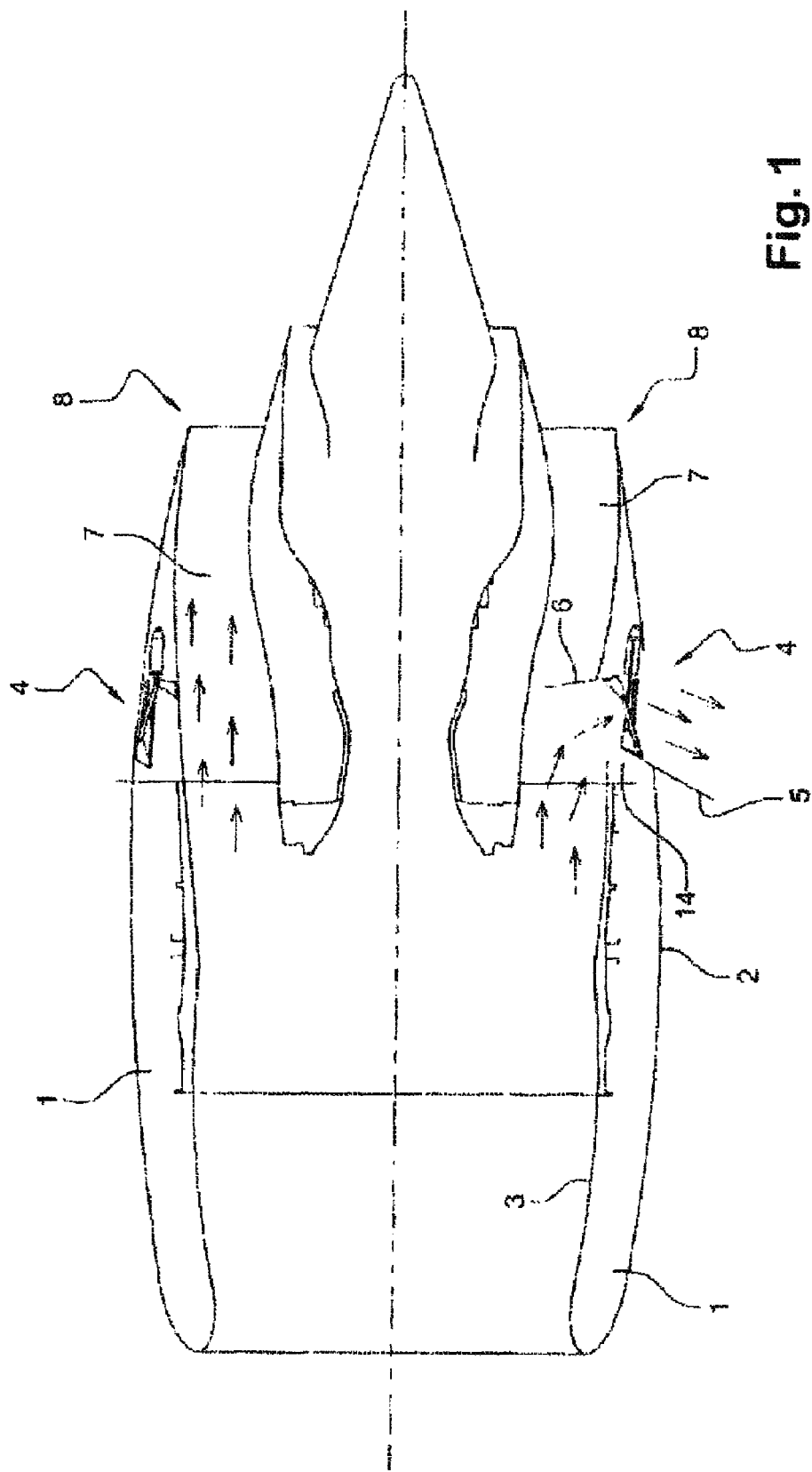

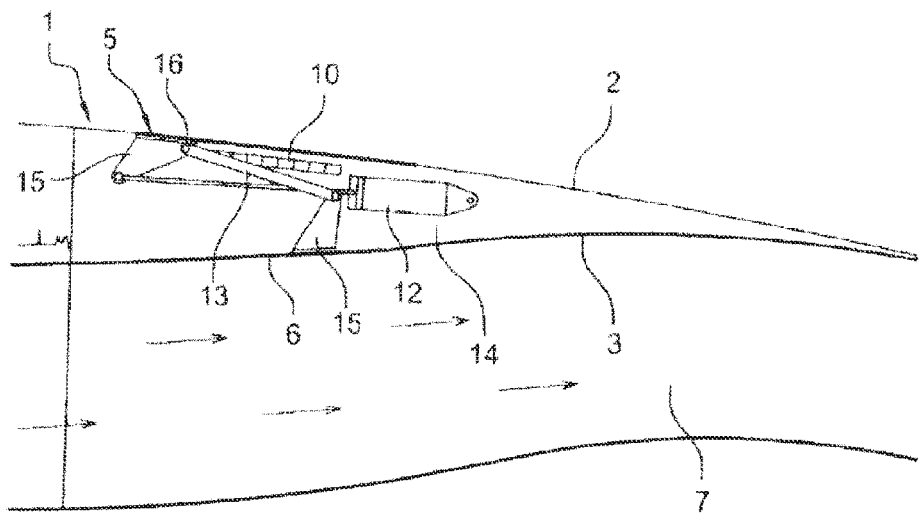
Fig. 2A
Fig. 2
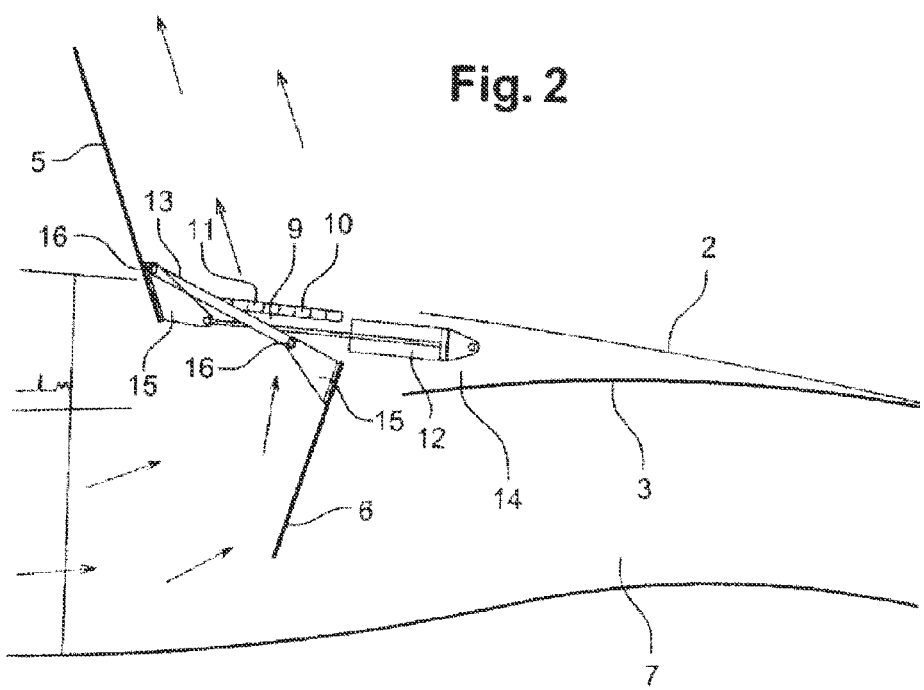
Fig. 2B

NACELLE FOR DOUBLE FLOW ENGINE

CROSS-REFERENCE TO RELATED APPLICATIONS

This application claims priority to and the benefit of French Application No. 08 55880, filed Sep. 2, 2008, the disclosure of which is incorporated herein by reference in its entirety.

BACKGROUND

1. Field

The present application pertains to the field of aeronautics, and in particular nacelles for aircraft. More precisely, the present application relates to an aircraft nacelle for a double-flow engine equipped with at least one thrust reverser.

2. Brief Description of Related Developments

It is known how to equip an aircraft with nacelles, each of which holds a direct-reaction engine, to assure its motions on land and in the air. Each nacelle is mounted on the lower surface of the wings. Air is drawn into the nacelle at the position of a front extremity of this nacelle, located at the front side of the aircraft. The nacelle ejects the absorbed air at high velocity toward the rear of the aircraft.

To provide for forward motion of the aircraft, it is necessary for an air mass passing through the nacelle to have a discharge velocity greater than the its intake velocity. The discharge velocity of the air mass is increased by a known method inside the nacelle.

The air passing through the nacelle is composed of two different flows. A first flow, called the primary flow, passes through the engine. The primary flow is ejected directly out of the nacelle from the rear of the engine. A second flow, called the secondary flow, passes through an air passage channel before being ejected outside of the nacelle. The air passage channel is arranged between an internal wall of a cowling of the nacelle and an external wall of the engine, and extends along the turbojet engine.

It is then known how to mount these thrust reverser nacelles to reduce the landing distance of the aircraft. Landing distance of the aircraft means the distance traveled by the aircraft between the moment when the landing gear of the aircraft touches the runway and the moment when the aircraft comes to a complete stop on the runway. These thrust reversers deflect part or all of the air flows departing at the rear of the nacelle, to eject them toward the front of the aircraft. These thrust reversers thus create an aerodynamic drag and accordingly a braking force called a "counterthrust," which contributes to the slowing of the aircraft.

Various thrust reversers are known from the prior art, such as thrust reversers with pivoting doors, or thrust reversers with grilles.

The document U.S. Pat. No. 3,829,020 discloses thrust reversers with a cowling that is movable in translation, which releases a door to rotate, and thus to block the flow of cold air and to modify its trajectory by expelling it to the side.

A nacelle equipped with thrust reversers with pivoting doors is also known, which has doors arranged within the thickness of the nacelle cowling. These doors are distributed around a circumference of the nacelle. In the inactive position, the doors are closed, in other words they extend in an extension of the cowling. In the active position, the doors are open. The displacement of the doors is such that a portion of the doors then extends toward the outside of the nacelle. A pivot axis of the doors is at a distance from a pivoting extremity of these doors. By pivoting extremity is meant the extremity of the doors on which the pivot axis is arranged. Thus, when the doors are open the pivoting extremity of the doors is located inside the nacelle, and at least partially obstructs the air passage channel. The flow of air is then blocked, and is evacuated outside of the nacelle through an orifice opened up by the opening of the doors. The portion of the doors that extends out of the nacelle provides for directing the flow toward the front of the nacelle.

Depending on the position of the doors on the cowling, the thrust reversers provide for a reversal of the thrust derived solely from the secondary flow, or the thrust derived from the primary air flow and from the secondary air flow. Actually, if the openings obstructed by the doors of the thrust reversers are arranged at a rear extremity of the cowling, the primary flow is evacuated through these openings, at the same time as the secondary flow. On the other hand, if the openings are arranged upstream from the primary flow, only the secondary flow is evacuated through the openings on the cowling.

The document FR 2 887 225 discloses a nacelle equipped with thrust reversers. Each thrust reverser is equipped with an internal door and an external door, with each of these doors having a unique direction of displacement. These two directions of displacement are opposite one another, so that when the thrust reverser is in the active position the external door sends the flow of air blocked by the internal door in the interior of the nacelle, toward the front of the nacelle. Locking means are provided to guarantee that no untimely opening of the doors can be produced when the aircraft is in flight.

But these thrust reversers with pivoting doors are currently associated with burdensome constraints of maintenance and design linked to the risk of untimely opening in flight, which can cause the loss of the airplane.

Accordingly, there is a pressing need for a nacelle equipped with thrust reversers that stay closed or that close in case of a failure, for example of the control device that provides for the sifting of these doors between the active and inactive positions.

SUMMARY

The aspects of the present application propose a nacelle for a double-flow engine that is simple in design and in its method of operation, with the nacelle comprising at least one thrust reverser whose closure is certain regardless of the kind of failure that may occur in flight.

To this end, the present application relates to a nacelle for a double-flow engine that has a cowling and at least one thrust reverser, with this thrust reverser having an internal door and an external door arranged in this cowling, and means for simultaneously shifting these doors between a stable retracted position in which the doors are integrated in the cowling and a stable deployed position in which the internal and external doors are positioned at least partially inside and outside of the nacelle, respectively, to deflect the secondary flow and to generate a thrust reversal.

In accordance with an aspect of the disclosed embodiments, these means for simultaneously shifting the doors comprise an actuator, one extremity of which is linked to one of the doors to shift this door between said extreme positions, and at least one linkage element linked to said doors to pivot by its extremities, so that the displacement of said door entails the displacement of the other door between these extreme positions.

By "internal" is meant pointing toward an internal volume of the nacelle. In the deployed position, the internal door at least partially blocks a flow of air passing through the air passage channel. By "external" is meant pointing toward the exterior of the nacelle. In the deployed position, the external door directs the flow of air toward the exterior of the nacelle.

By "simultaneously" is meant that the means for displacing the doors provide for opening or closing the internal door and the external door of the same thrust reverser at the same time. Thus the opening of the external and internal doors is concomitant. When an aircraft equipped with such a nacelle is landing, the internal and external doors of the thrust reverser are opened so that the flow of air blocked by the internal door is deflected toward the outside of the nacelle by the external door. These means for simultaneously displacing said doors are held in a compartment in said cowling.

"Cowling" means either a single cowling in which the two doors are arranged, or two superposed cowlings in each of which a door is arranged.

"Stable retracted position" means that said doors are integrated into the cowling, extending in an extension of the external and internal cowlings, respectively.

In different particular modes of embodiment of this nacelle for aircraft, each having its particular advantages and being capable of numerous possible technical combinations:

with this actuator linked at one extremity to one of the doors so that the internal and external doors are in the deployed position, the external door is positioned vis-à-vis the internal door parallel or essentially parallel to it.

In addition, the dimensions of the internal and external doors are such that the application of the sole pressures $P_1$ exerted by a flow incident on the surface $S_1$ of said external door positioned outside the nacelle in the deployed position, and $P_2$ exerted by the secondary flow on the surface $S_2$ of said internal door in the deployed position, hold said doors in the stable retracted position.

It is thus assured that the internal and external doors remain closed or close in case of the failure, for example, of the actuator.

this nacelle has a grille designed to orient the secondary flow in the deployed position of the internal and external doors, the cowling has an internal cowling in which the internal door of at least one thrust reverser is arranged, and an external cowling at least partially superposed on the internal cowling, in which the external door of said thrust reverser is arranged, with said means for simultaneously displacing these doors being placed between the internal and external cowlings.

Finally, the invention relates to an aircraft equipped with at least one nacelle such as described above.

BRIEF DESCRIPTION OF THE DRAWINGS

The aspects of the disclosed embodiments will be described in further detail with reference to the attached drawings, in which:

FIG. 1 is a view in longitudinal cross section of a nacelle for a double-flow engine in a particular embodiment of the present application;

FIGS. 2A and 2B are enlarged views of a thrust reverser of the nacelle of FIG. 1, with the doors of this reverser appearing in the retracted position (FIG. 2A) and in the deployed position (FIG. 2B);

DETAILED DESCRIPTION

Figure 3:
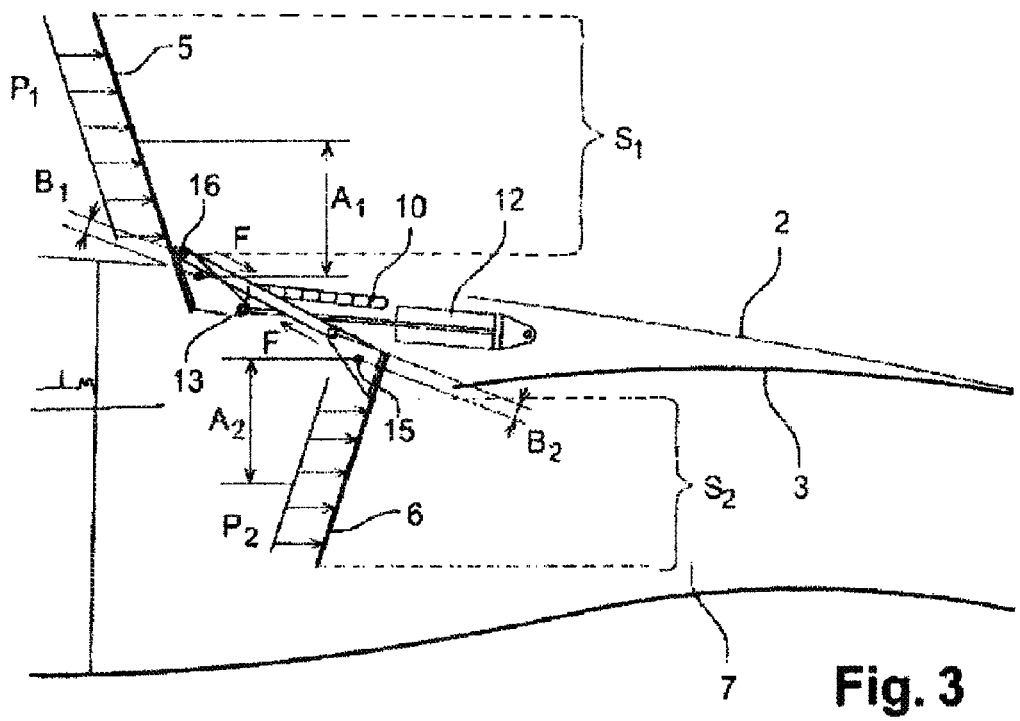
FIG. 3 shows schematically the forces acting on the thrust reverser when it is actuated and when the external and internal doors respectively are subjected to an external flow and to the secondary flow of the engine.

FIGS. 1 to 4 show a nacelle for a double-flow engine according to a particular embodiment of the present application. This nacelle has a cowling 1 with an external wall 2 and an internal wall 3. This nacelle has a double-flow engine (not shown) placed in the internal volume of the nacelle delimited by the cowling 1. The nacelle also has a turboblower (not shown) located in the internal volume in front of the engine. "Front" means directed toward a cockpit of the aircraft on which the nacelle is to be mounted.

The nacelle is also equipped with thrust reversers 4. Two thrust reversers are shown in FIG. 1, one being in the active position and the other in the inactive position.

Each thrust reverser 4 has two doors, an external door 5 and an internal door 6, which are arranged respectively on the external wall 2 and the internal wall 3 of the cowling 1 of the nacelle. For the thrust reverser 4 in the inactive position (FIG. 2a), the external door 5 and the internal door 6 are in a stable retracted position, i.e. they extend in the extension of the external wall 2 and the internal wall 3 of the cowling 1 of the nacelle.

For each thrust reverser, the nacelle also has means for simultaneously displacing these doors, external 1 and internal 6, between a stable retracted position in which said doors are integrated into the cowling 1, and a stable deployed position in which the internal door 6 and the external door 5 are placed partly inside and outside of the nacelle, respectively, to deflect the secondary flow and to generate a thrust reversal.

In this latter position, the internal door 6 is accordingly partially placed in the internal volume of the nacelle to obstruct the air passage channel 7 through which the secondary air flow passes. The secondary air flow can then no longer be directed toward the rear extremity 8 of the nacelle to be expelled out of the nacelle. The external door 5 also being open, the secondary air flow can be expelled through the opening 9 made available by the open doors 5, 6. A grille 10 is placed inside the opening 9 to orient the secondary flow in the deployed position of the external door 5 and of the internal door 6. This grille 10 beneficially has orifices 11 oriented so as to orient the secondary flow parallel to the surface of the external door 5 in the deployed, or open, position.

The means for simultaneously displacing the doors 5, 6 comprise an actuator 12, one extremity of which is linked to the external door 5 to displace this door 5 between said extreme positions, and a linkage element 13 linked to pivot by its extremities on the external door 5 and the internal door 6 so that the displacement of the external door by command of the actuator 12 entails the shifting of the internal door 6 between said stable extreme, retracted, and deployed positions.

The actuator 12 here is a screw jack held in a compartment 14 of the cowling 1, with this compartment being placed between the external wall 2 and the internal wall 3 of the cowling 1. This screw jack 12 can be a hydraulic or electric screw jack. This screw jack 12 is linked to a control circuit (not shown) that provides for controlling this screw jack 12 from the cockpit to shift the external door 5 and the internal door 6 simultaneously between the aforementioned extreme positions. The linkage element 13 is a dual-hinged connecting rod. The external door 5 and the internal door 6 are preferably linked to one another by two dual-hinged connecting rods, each linking a lateral edge of these doors 5, 6.

An extremity of the external door 5 and of the internal door 6 are each mounted to pivot on the cowling 1 of the nacelle. The pivot point 15 of each of the doors is spaced away from the linkage point 16 of the dual-hinged connecting rod 13 linking the external door 5 and the internal door 6 to one another. When the doors 5, 6 are in the deployed, or open, position, a portion of these doors containing the pivot point 15 is positioned inside the cowling 1 between the internal wall 3 and the external wall 2 so that they block the passage of an air flow. In addition, the dimensions of the internal door 6 and the internal door 5 are such that the application of the sole pressures $P_1$ exerted by a flow incident on the surface $S_1$ of the external door 5 located outside of the nacelle in the deployed position, and $P_2$ exerted by the secondary flow on the surface $S_2$ of said internal door 6 in the deployed position, hold these doors in the stable retracted, or closed, position. More precisely, it is necessary for the dimensions of the portions of the doors $S_1$ and $S_2$ on which the pressures $P_1$ and $P_2$ are exerted, respectively, to satisfy the following formula:

$$P_1 \times S_1 \times A_1 - B_1 \times F > P_2 \times S_2 \times A_2 - B_2 \times F$$

where $A_1$ and $A_2$ are the distances separating the barycenters of the surfaces $S_1$ and $S_2$ from the pivot points 15 of the external door 5 and the internal door 6, and $B_1$ and $B_2$ are the distances separating the linkage points 16 of the dual-hinged connecting rod 13 on the external door 5 and the internal door 6 relative to the corresponding pivot points 15. F is a compressive force applied to the connecting rod 13 by the pressures $P_1$ and $P_2$ exerted on the surfaces $S_1$ and $S_2$ of the external door 5 and the internal door 6.

Figure 4:
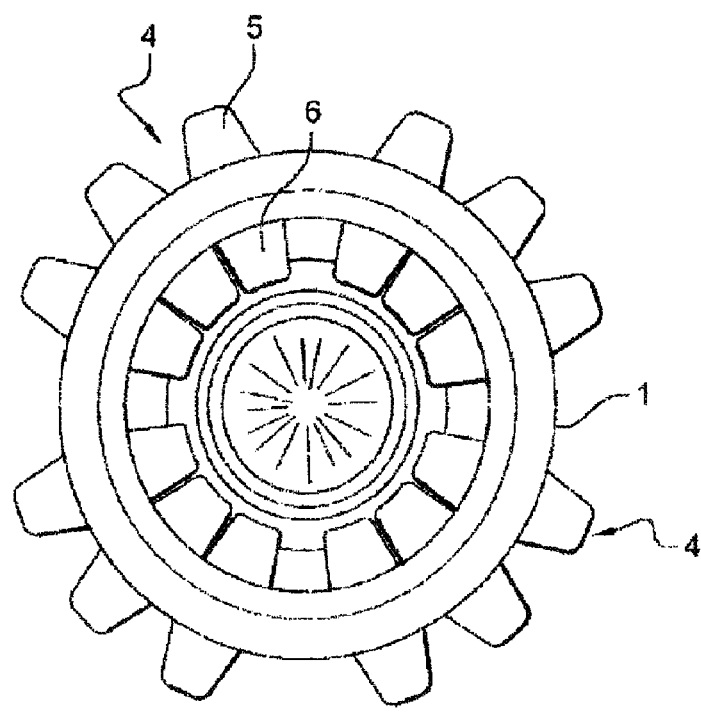
FIG. 4 is a front view of a nacelle with its thrust reversers actuated.

FIG. 4 shows a front view of the nacelle. The thrust converters 4 that are actuated are arranged on the cowling 1 by being positioned around the circumference of the nacelle. These reversers, which are distributed here discontinuously around this circumference, are grouped in groups of three thrust reversers 4. The nacelle thus has four groups that are placed in diametrically opposite positions in pairs.

The invention claimed is:

1. A nacelle for a double-flow engine with a cowling and at least one thrust reverser, said thrust reverser having an internal door and an external door arranged in said cowling, and means for simultaneously shifting said doors between a stable retracted position in which the doors are integrated in said cowling and a stable deployed position in which said internal and external doors are positioned at least partially inside and outside of said nacelle, respectively, to deflect to the outside, a secondary flow which circulates inside the nacelle around the engine and to generate a thrust reversal, wherein:

said means for simultaneously shifting said doors comprise an actuator, one extremity of which is linked to one of said doors to shift this door between said extreme positions, and at least one linkage element linked to said doors to pivot by its extremities, so that the shifting of said door entails the shifting of the other door between said extreme positions, said actuator and said linkage element are so arranged that when said internal and external doors are in the deployed position, said external door is positioned vis-à-vis the internal door essentially parallel to said internal door, and the dimensions of said internal and external doors are defined in such a way that the sole application of the pressures P1 and P2, respectively corresponding to the pressure exerted by an external incident flow on the surface S1 of said external door when deployed outside the nacelle and to the pressure exerted by the secondary flow of the engine on the surface S2 of said internal door when deployed inside the nacelle, holds said doors in the stable retracted position.

2. The nacelle pursuant to claim 1, wherein said linkage elements of said doors are dual-hinged connecting rods.

3. The nacelle pursuant to claim 1, wherein said actuator is a screw jack held in a compartment of said cowling.

4. The nacelle pursuant to claim 1, further comprising a grille configured to orient the secondary flow in the deployed position of said doors.

5. The nacelle pursuant to claim 4, wherein with said grille arranged in said cowling, said grille has orifices oriented so as to orient said secondary flow parallel to the surface of said external door in the deployed position.

6. The nacelle pursuant to claim 1, further comprising that said thrust reversers are arranged in said cowling by being placed around the circumference of said nacelle.

7. The nacelle pursuant to claim 6, wherein with said thrust reversers distributed discontinuously around said circumference, said nacelle has four groups of three thrust reversers each, said groups being diametrically opposite in pairs.

8. An aircraft equipped with at least one nacelle according to claim 1.

* * * * *

UNITED STATES PATENT AND TRADEMARK OFFICE
CERTIFICATE OF CORRECTION

| | | |
|---|---|---|
| PATENT NO. | : 8,162,257 B2 | Page 1 of 1 |
| APPLICATION NO. | : 12/551648 | |
| DATED | : April 24, 2012 | |
| INVENTOR(S) | : Olivier Teulou | |

It is certified that error appears in the above-identified patent and that said Letters Patent is hereby corrected as shown below:

Title Page, Col. 1 (75) Inventor: delete "Tam" and insert -- Tarn --, therefor.

Title Page, Col. 1 (30) Foreign Application Priority Data: delete "Feb. 9, 2008" and insert -- Sep. 2, 2008 --, therefor.

Signed and Sealed this
Twelfth Day of June, 2012

David J. Kappos
*Director of the United States Patent and Trademark Office*